(12) United States Patent
Kuo et al.

(10) Patent No.: US 11,484,098 B2
(45) Date of Patent: Nov. 1, 2022

(54) PRESS PAD FOR ASSEMBLING PARTS OF A SHOE

(71) Applicant: NIKE, Inc., Beaverton, OR (US)

(72) Inventors: Derek Kuo, Taichung (TW); Yen Lin Lee, Taichung (TW); Dawei Wang, Taipei (TW); Hugo Lin, Qingyuan (CN)

(73) Assignee: NIKE, Inc., Beaverton, OR (US)

( * ) Notice: Subject to any disclaimer, the term of this patent is extended or adjusted under 35 U.S.C. 154(b) by 500 days.

(21) Appl. No.: 16/425,564

(22) Filed: May 29, 2019

(65) Prior Publication Data

US 2019/0365055 A1    Dec. 5, 2019

Related U.S. Application Data

(60) Provisional application No. 62/678,859, filed on May 31, 2018.

(51) Int. Cl.
| | |
|---|---|
| *A43D 25/06* | (2006.01) |
| *B29C 43/36* | (2006.01) |
| *B29C 65/48* | (2006.01) |
| *B29D 35/14* | (2010.01) |
| *A43D 25/10* | (2006.01) |

(52) U.S. Cl.
CPC .......... *A43D 25/10* (2013.01); *B29C 43/3642* (2013.01); *B29C 65/4825* (2013.01); *B29D 35/142* (2013.01); *B29C 2043/3649* (2013.01)

(58) Field of Classification Search
CPC ........................... A43D 25/10; B29C 43/3642; B29C 65/4825; B29C 2043/3649; B29D 35/142
See application file for complete search history.

(56) References Cited

U.S. PATENT DOCUMENTS

| | | | |
|---|---|---|---|
| 2,001,002 | A | 5/1935 | Thomas |
| 2,012,272 | A | 8/1935 | Finn |
| 2,024,154 | A | 12/1935 | Finn |
| 2,202,750 | A | 5/1940 | Andia |
| 2,345,060 | A | 3/1944 | Morton |
| 2,445,565 | A | 7/1948 | Dawson |

(Continued)

FOREIGN PATENT DOCUMENTS

| | | |
|---|---|---|
| CN | 1316208 A | 10/2001 |
| CN | 201929151 U | 8/2011 |

(Continued)

OTHER PUBLICATIONS

Rosato, Don, "Innovative smart polymer material and process advances on the rise," MultiBrief: Exclusive, exclusive. multibriefs. com, Mar. 2, 2015.

(Continued)

*Primary Examiner* — Sharon M Prange
*Assistant Examiner* — Erick I Lopez
(74) *Attorney, Agent, or Firm* — Shook, Hardy & Bacon L.L.P.

(57) ABSTRACT

Aspects of this disclosure relate to apparatuses and methods that employ a press pad for forming shoe parts, or subassemblies, for example a sole subassembly. The adaptive pad may conform to a topography of a pattern of recesses of a shoe part and provide sufficient rigidity to facilitate formation of a bond during pressing of the one or more shoe parts to form the sole subassembly.

20 Claims, 10 Drawing Sheets

(56) References Cited

U.S. PATENT DOCUMENTS

| 2,463,672 | A | 3/1949 | Baker |
| 2,914,782 | A | 12/1959 | Prahl, Jr. et al. |
| 3,212,115 | A | 10/1965 | Crowell |
| 3,444,591 | A | 5/1969 | Anderson et al. |
| 4,131,667 | A | 12/1978 | Lovell et al. |
| 4,518,335 | A | 5/1985 | Pujari |
| 6,676,782 | B2 | 1/2004 | Chi |
| 7,490,416 | B2 | 2/2009 | Townsend |
| 2006/0234572 | A1 | 10/2006 | Wagner et al. |
| 2007/0298139 | A1 | 12/2007 | Balboni et al. |
| 2009/0300949 | A1 | 12/2009 | Frederick et al. |
| 2013/0318833 | A1 | 12/2013 | Izquieta Anaut et al. |
| 2014/0223649 | A1 | 8/2014 | Fowler et al. |

FOREIGN PATENT DOCUMENTS

| CN | 202496523 U | | 10/2012 | |
| DE | 259 987 C | * | 5/1913 | |
| DE | 259987 C | | 5/1913 | |
| DE | 270 170 C | * | 2/1914 | |
| DE | 270170 C | | 2/1914 | |
| DE | 8629649 U1 | | 12/1986 | |
| DE | 102010064065 A1 | | 6/2012 | |
| DE | 102013103432 A1 | | 10/2014 | |
| EP | 1902639 A1 | | 3/2008 | |
| FR | 2118207 A5 | | 7/1972 | |
| FR | 2443324 A1 | | 7/1980 | |
| WO | 03003866 A1 | | 1/2003 | |
| WO | WO-03003866 A1 | * | 1/2003 | ............ A43D 25/10 |
| WO | 2015057060 A1 | | 4/2015 | |

OTHER PUBLICATIONS

International Preliminary Report on Patentability received for PCT Patent Application No. PCT/US2019/034941, dated Dec. 10, 2020, 9 pages.

International Search Report and Written Opinion dated Sep. 20, 2019 in International Patent Application No. PCT/US2019/034941, 16 pages.

* cited by examiner

PRESS PAD FOR ASSEMBLING PARTS OF A SHOE

CROSS-REFERENCE TO RELATED APPLICATIONS

This application claims the benefit of U.S. Provisional Patent Application No. 62/678,859, titled "Press Pad For Assembling Parts Of A Shoe", filed May 31, 2018, which is hereby incorporated by reference in its entirety.

TECHNICAL FIELD

The present disclosure relates to apparatuses and methods for manufacturing parts of a shoe. More particularly, the present disclosure describes a shoe press pad that includes a shear-thickening material.

BACKGROUND

Some shoe parts are formed by coupling multiple parts together. For example, a first sole component (e.g., outsole component) may be coupled to a second sole component (e.g., midsole component). Various coupling techniques may be used, and in some instances, parts are bonded or adhered to one another.

SUMMARY

This disclosure relates to apparatuses and methods that employ one or more press pads to bond or adhere a first shoe part (e.g., outsole component) to a second shoe part (e.g., midsole component). In practice, after the shoe parts have been initially assembled together with a bonding agent, and prior to being permanently bonded, the shoe parts are placed in a jig containing the press pad.

The press pad provides a contact surface within the jig that conforms to the topography of the first shoe part, the second shoe part, or both shoe parts to help evenly distribute pressure while the parts are being coupled to one another. For instance, the press pad may include a shear-thickening material that can conform to the topography when a first pressure is applied and that can provide an evenly distributed bonding force at a second pressure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Illustrative aspects of the present invention are described in detail below with reference to the attached drawing figures, which are incorporated by reference herein, wherein.

DETAILED DESCRIPTION

Subject matter is described throughout this Specification in detail and with specificity in order to meet statutory requirements. But the aspects described throughout this Specification are intended to be illustrative rather than restrictive, and the description itself is not intended necessarily to limit the scope of the claims. Rather, the claimed subject matter might be practiced in other ways to include different elements or combinations of elements that are similar to the ones described in this Specification and that are in conjunction with other present, or future, technologies. Upon reading the present disclosure, alternative aspects may become apparent to ordinary skilled artisans that practice in areas relevant to the described aspects, without departing from the scope of this disclosure. It will be understood that certain features and subcombinations are of utility and may be employed without reference to other features and subcombinations. This is contemplated by, and is within the scope of, the claims.

In this disclosure, relative locational and positional terminology may be utilized. For example, the term "proximate" is intended to mean on, about, near, by, next to, at, and the like. Therefore, when a feature is proximate another feature, it is close in proximity but not necessarily exactly at the described location, in some aspects. Terminology relating to relative positions of various features of the aspects is also used herein. For example, the terms "superior," "superior to," and "above" are intended to mean that features herein are nearer a top plate of sole-subassembly bonding apparatus than a bottom plate or jig, as compared to other features. Additionally, the term "top" is intended to indicate a portion of a feature that is nearer the top plate than the bottom plate of the sole-subassembly bonding apparatus. Accordingly, the term "bottom" refers to a portion of a feature that is nearer the bottom plate than the top plate. Further, directional terminology is used herein. For example, the term "vertically" is intended to mean that a feature extends in a direction extending from the bottom plate toward the top plate, or vice versa. Additionally, the term "horizontally" is intended to mean that a feature extends in a direction extending from a heel end of the sole subassembly toward a toe end of the sole subassembly, or vice versa. Accordingly, the term "diagonally" is intended to indicate that a feature extends both vertically and horizontally. Further, the term "edge," as used herein refers to a terminating edge of a material and not a portion of the material, such as an apex.

At a high level, this disclosure describes attaching shoe parts together to form a shoe subassembly, such as by attaching parts of a shoe sole together. For example, outsole components may be attached together; an outsole component may be attached to a midsole component; and midsole components may be attached together. The shoe parts may be coupled, for example, by applying a bonding agent to one or both of the shoe parts, which are then mated together. The mated parts may then be placed in a jig designed to apply pressure to the parts while the bonding agent sets, cures, or otherwise becomes permanent.

When bonding the shoe parts, maximizing surface-area contact between the parts and providing an evenly distributed pressure can improve the strength of the bond. As such, an aspect of the disclosure includes a press pad that is arranged within the jig and that functions to evenly distribute pressure around at least part of the shoe parts.

At a high level, the press pad may include a suspension of solid particles in a fluid or other medium. For example, the press pad may include a shear-thickening material that is formulated to have a viscosity that increases as shear forces (or shear rates) increase. These and other aspects will be described in more detail with reference to the various figures.

Figure 1:
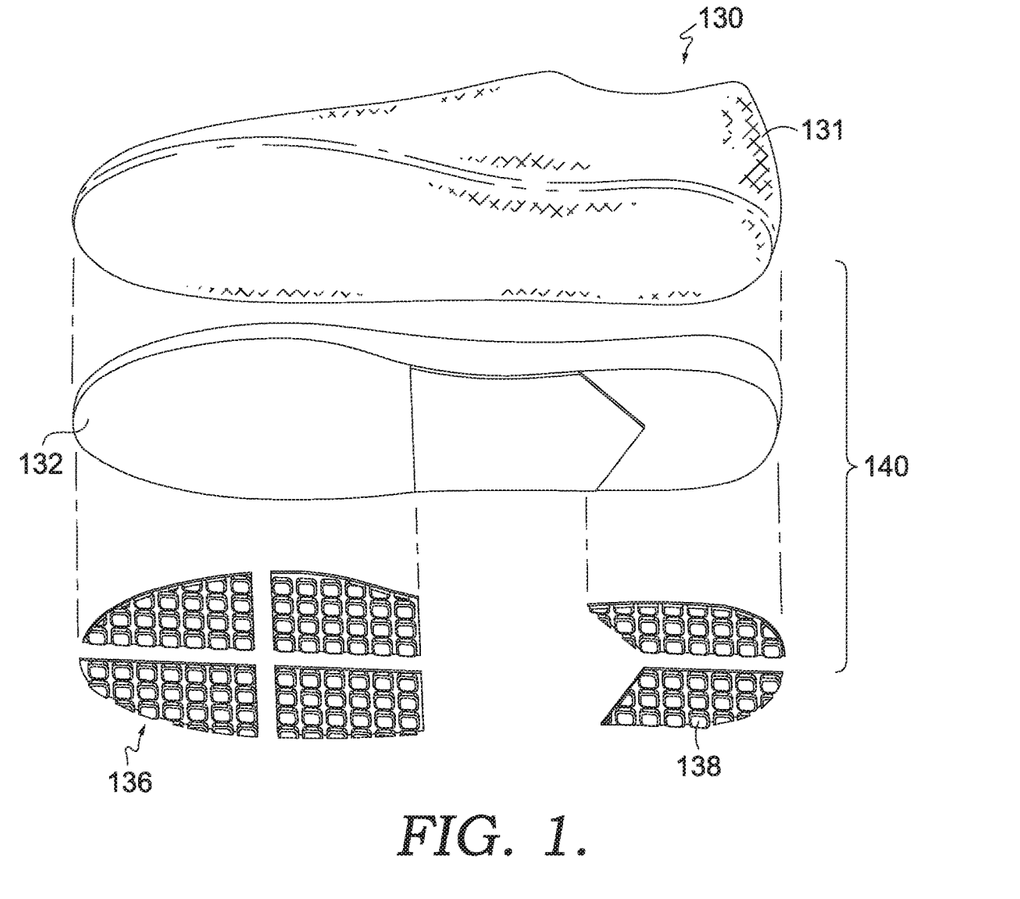
FIG. 1 depicts a bottom perspective view of an article of footwear having an unassembled sole subassembly, in accordance with aspects hereof.

Referring now to FIG. 1, a bottom perspective view of an exemplary article of footwear 130 in a partially unassembled state. Articles of footwear, for example shoes, athletic shoes, cleats, spikes, boots, and the like, typically include an upper 131. Further, articles of footwear include a sole that is coupled to the upper 131. A sole may be comprised of multiple parts (e.g., an outsole or outsole elements 136 and a midsole 132), which may be adhesively bonded, or otherwise coupled to one another to form a sole subassembly 140. The outsole elements 136 may include a plurality of tread elements 138 that provide traction between the sole subassembly 140 and a contact surface for which the article of footwear 130 is intended to be used. Exemplary contact surfaces include a court, a pitch, a field, a track, a mat, a floor, and the like.

Figure 2:
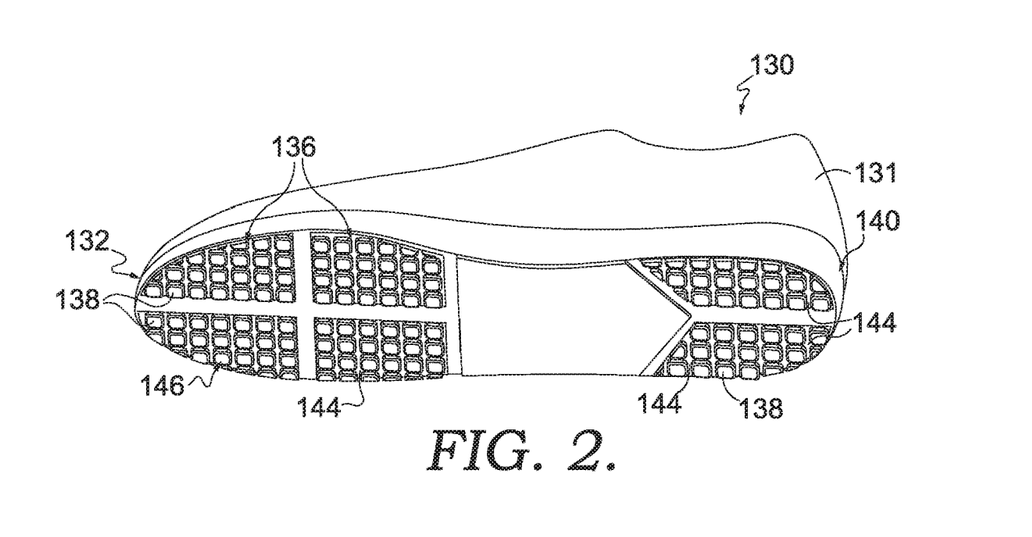
FIG. 2 depicts a bottom perspective view of an assembled article of footwear, in accordance with aspects hereof.

FIG. 2 depicts the article of footwear 130 in an assembled state. As can be appreciated, in the assembled article of footwear 130, upper 131 has been attached to or otherwise affixed to the sole subassembly 140 to create an assembled article of footwear 130. The outsole may comprise a single element, or several discrete outsole elements 136 that are coupled to the midsole 132 at selected locations. Further, the outsole elements 136 may be affixed or bonded with the midsole 132 by using a bonding agent to form the sole subassembly 140. Exemplary bonding agents may include pressure-sensitive adhesives, drying adhesives, solvent-based adhesives, polymer dispersion adhesives, contact adhesives, multi-component adhesives, one-part adhesives, and hot-melt adhesive, among others.

The tread elements 138 may be protrusions that extend from the outsole elements 136 and the midsole 132 to create a tread pattern 146, or other traction-gaining formation, on the sole subassembly 140. Accordingly, the tread pattern 146 may include a plurality of concavities, such as grooves, undercuts, and other concave features, which will generally be referred to herein as recesses 144. As a result, the sole subassembly 140 includes a geometry or topography that corresponds to the protrusions created by tread elements 138 and recesses 144 created by the tread pattern 146. Although FIGS. 1 and 2, as well as various other figures described in this disclosure, depict an outsole element bonded to a midsole element, other types of shoe parts that are bonded to one another may include recesses. For example, a discrete midsole component (e.g., fluid-filled cushioning bag) may have recesses and may be affixed to another midsole component (e.g., foam element). Accordingly, aspects of this disclosure also include apparatuses and methods for bonding a first shoe part to a second shoe part, and are not limited to bonding an outsole component to a midsole component.

In some instances, a custom jig is constructed for each type of tread pattern (or other pattern of recesses), and such jigs include tread-specific construction to provide matching protrusions at the proper location to mate with the tread structures. Because of the tread-specific nature of custom jigs, it can be difficult to reuse these types of jigs with more several different tread designs. In addition, some jigs with relatively small ribs, protrusions, and other portions that mate with tread patterns can wear over time possibly leading to issues with bonding. Accordingly, an aspect of the present invention is directed to a press pad provides a contact surface within the jig that conforms to the topography of a first shoe part, a second shoe part, or both shoe parts to help evenly distribute pressure while the parts are being coupled to one another. For instance, the press pad may include a shear-thickening material that can conform to the topography when a first pressure is applied and that can provide an evenly distributed bonding force at a second pressure.

Figure 3:
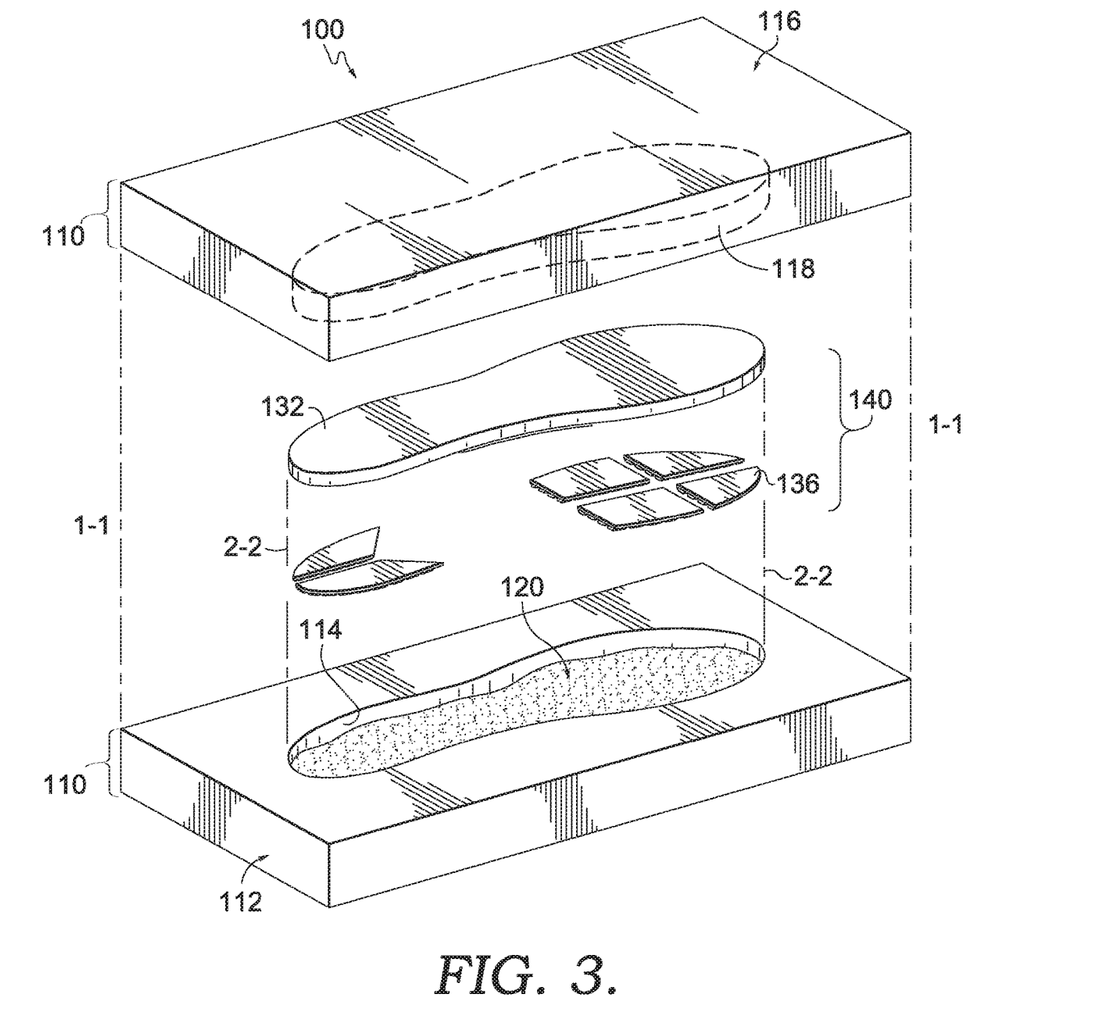
FIG. 3 depicts a top perspective view of a sole-subassembly bonding apparatus having an unassembled sole subassembly, in accordance with aspects hereof.

FIG. 3 depicts a top perspective view of a sole-subassembly bonding apparatus 100, having an unassembled sole subassembly 140, in accordance with aspects hereof. The view of the sole-subassembly bonding apparatus 100 depicted here is intended to provide a general overview of the various parts or components of the sole-subassembly bonding apparatus 100 to aid in the understanding of an exemplary structure of an exemplary sole-subassembly bonding apparatus 100. Accordingly, the sole-subassembly bonding apparatus 100 may include a jig 110 having a bottom plate 112 (which may also be referred to as a first plate), a cavity 114 formed within the bottom plate 112, an adaptive pad 120 disposed within cavity 114, a top plate 116 (which may also be referred to as a second plate), and a core 118 that is configured to mate with and fit within cavity 114.

Beginning generally from the bottom of the sole-subassembly bonding apparatus 100, the jig 110 may be formed from a metal or other material that provides a sufficient container force to withstand the pressures and shear forces described herein for bonding midsole 132 and outsole elements 136. In one aspect, the material of the jig 110 may be a material that is configured to withstand a pressure of about 40 kg/cm$^2$ to about 80 kg/cm$^2$. However, the pressure that the jig 110 is configured to withstand may vary depending on any number of factors, such as a type of pressing machine used with the sole-subassembly bonding apparatus 100, or properties of the adaptive pad 120. Accordingly, the jig 110 may be configured to withstand a pressure of less than 40 kg/cm$^2$ or more than 80 kg/cm$^2$. The cavity 114 may be formed within the bottom plate 112 and may have a shape that generally corresponds to the shape of sole subassembly 140. The term "bottom plate" is used herein for descriptive purposes, however, the bottom plate 112 may be in virtually any position depending on the orientation of the jig 110 and the configuration of the apparatus with which it is used. Accordingly, the bottom plate 112 may also be referred to as a first plate 112. The cavity 114 may generally operate to provide a container for the adaptive pad 120, and in some aspects, may be referred to as a flow-control cavity, in that the cavity 114 may control, direct, or contain the flow of adaptive pad 120. Additionally, the cavity 114 may have a depth that is sufficient to receive the adaptive pad 120, the sole subassembly 140, and all, or substantially all of, the core 118. Said another way, the cavity 114 may have a depth that is at least as deep as the combined thickness of the adaptive pad 120, the sole subassembly 140, and the core 118.

The adaptive pad 120, at a high level, may comprise a dispersive material that conforms to a tread pattern 146 of sole subassembly 140 to facilitate bonding of midsole 132 to outsole elements 136. As used herein, "adaptive" may refer to a pad is usable with a variety of sole subassemblies and is conformable to the contours thereof. In one aspect, the adaptive pad 120 may comprise a shear-thickening material (such as a dilatant or other type of non-Newtonian fluid), which exhibits a variable viscosity depending on a shear force (which may be created by bonding pressures or loading rates) applied to the shear-thickening material. Further, the shear-thickening material may be formulated to have a viscosity such that, when no shear force is applied, the shear-thickening material is flowable about the geometry of sole subassembly 140 and to the shape of cavity 114. Further, the adaptive pad 120 may provide a cushioning effect within the jig 110, which may reduce abrasion and wear, and increase durability of the jig 110. The composition of the shear-thickening material will be described in more detail below with reference to FIG. 6 and FIG. 7 (shown as element 122).

The top plate 116 may generally operate to impart pressure to sole subassembly 140, in order to facilitate bonding, setting, or curing of the bonding agent. The term "top plate" is used herein for descriptive purposes; however, the top plate 116 may be in virtually any position depending on the orientation of the jig 110 and the configuration of the apparatus with which it is used. Accordingly, the top plate 116 may also be referred to as a second plate 116. As can be appreciated, sole-subassembly bonding apparatus 100 may employ any suitable mechanism for supplying a bonding pressure. For example, jig 110 may be placed in a pressing machine (such as hydraulic, pneumatic, or mechanical pressing machines, and the like), which may impart the bonding pressure to the top plate 116. Although this description generally describes the top plate 116 as imparting pressure, it is contemplated that pressure may also be applied via the bottom plate 112. In other aspects, both the top plate 116 and the bottom plate 112 may impart pressure for facilitating the bond. The core 118 may be integrally formed with, or may be a discrete component from top plate 116. The core 118, as mentioned above, has a size and shape that allows core 118 to fit within cavity 114. Accordingly, the core 118 may penetrate the cavity 114 and contact the sole subassembly 140 to impart the bonding pressure.

Figure 4:
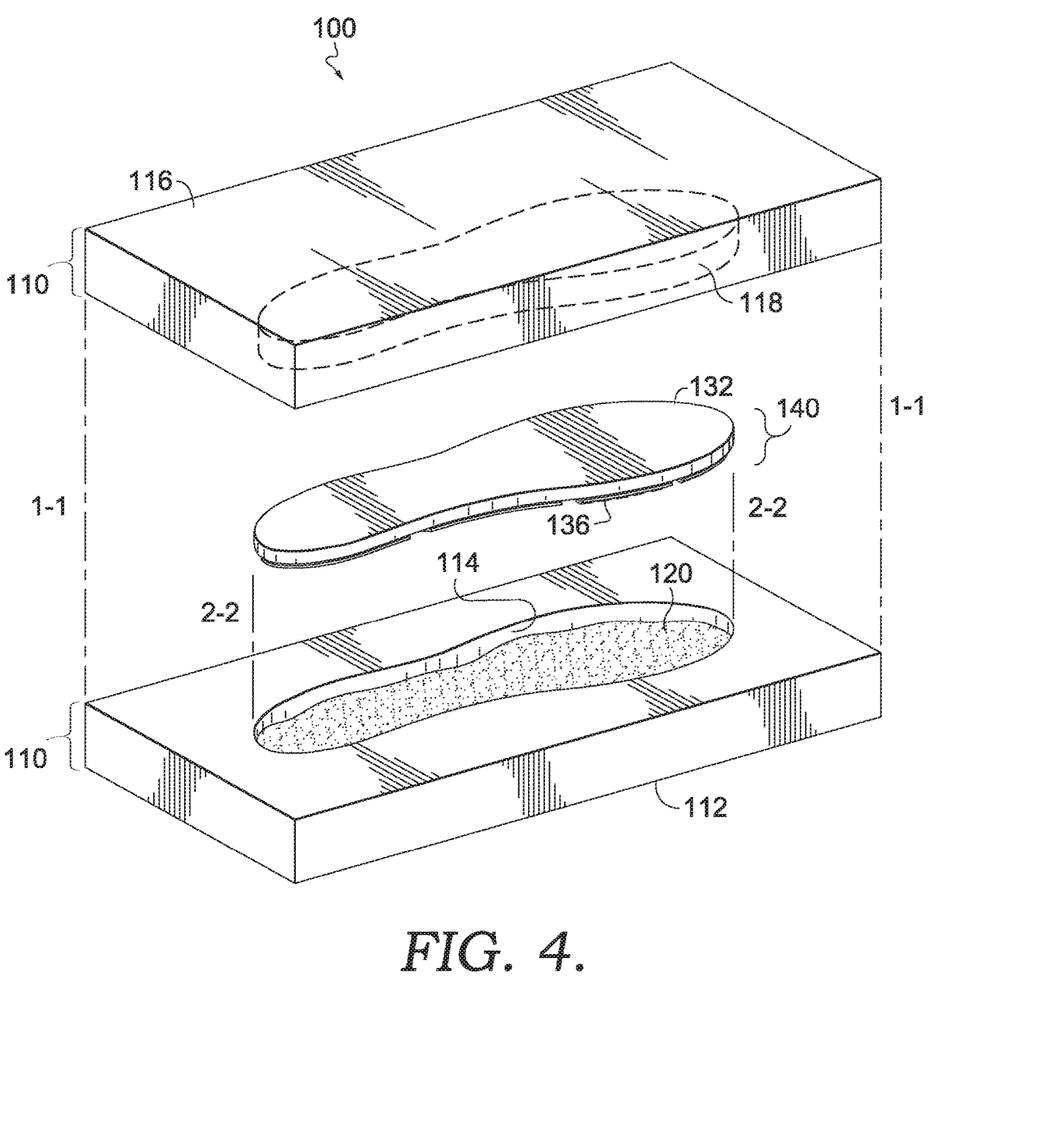
FIG. 4 depicts a top perspective view of the sole-subassembly bonding apparatus according to FIG. 3 having an assembled sole subassembly, in accordance with aspects hereof.

FIG. 4 depicts a top perspective view of the sole-subassembly bonding apparatus 100 according to FIG. 3, having an assembled sole subassembly 140. The midsole 132 and outsole elements 136 may be coupled using any suitable bonding agent, such as those discussed hereinabove. It should be appreciated that the above-noted adhesives are exemplary in nature only and any suitable means of coupling the midsole 132 and outsole elements 136 is considered within the scope of this disclosure.

The coupling of the midsole 132 and outsole elements 136 forms the sole subassembly 140. However, completing the manufacture of the sole subassembly 140 may be accomplished by applying the bonding pressure to sole subassembly 140 as the adhesive agent bonds, sets, cures, or otherwise becomes permanent, facilitating the creation of a secure bond. Accordingly, the sole subassembly 140 may be placed within the cavity 114, for example along line 2-2, and in contact with adaptive pad 120, and the top plate 116 may be moved proximate the bottom plate 112, for example along line 1-1, for application of the bonding pressure.

Figure 5:
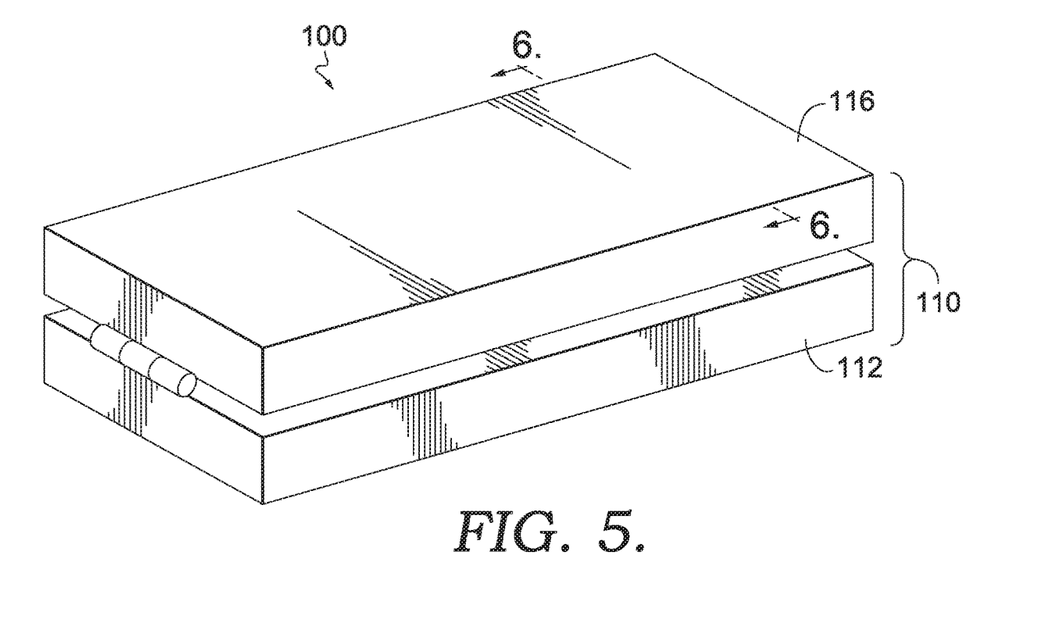
FIG. 5 depicts the sole-subassembly bonding apparatus according to FIG. 4 in a first, closed position, in accordance with aspects hereof.

FIG. 5 depicts a top perspective view of the sole-subassembly bonding apparatus 100, with the jig 110 in a first, closed position. In the first position shown here, the top plate 116 has been moved toward the bottom plate 112. In one aspect, the bottom plate 112 and top plate 116 may be hingedly affixed one another. However, in other aspects the bottom plate 112 and top plate 116 may be unaffixed. For example, one or both of the bottom plate 112 and top plate 116 may be integrated with a pressing machine. Continuing with this example, the top plate 116 may be an actuated plate that is moved toward the bottom plate 112 via mechanized actuation. Accordingly, as will be discussed in more detail with reference to FIG. 6, in the first position, the top plate 116 is proximate or adjacent to the bottom plate 112, and the core is proximate or adjacent to the sole subassembly (for example as depicted in FIG. 3), such that pressure is applied to the sole subassembly. However, as previously indicated, the bottom plate 112 may be actuated, instead of the top plate 116, or both the bottom plate 112 and the top plate 116 may be actuated.

Figure 6:
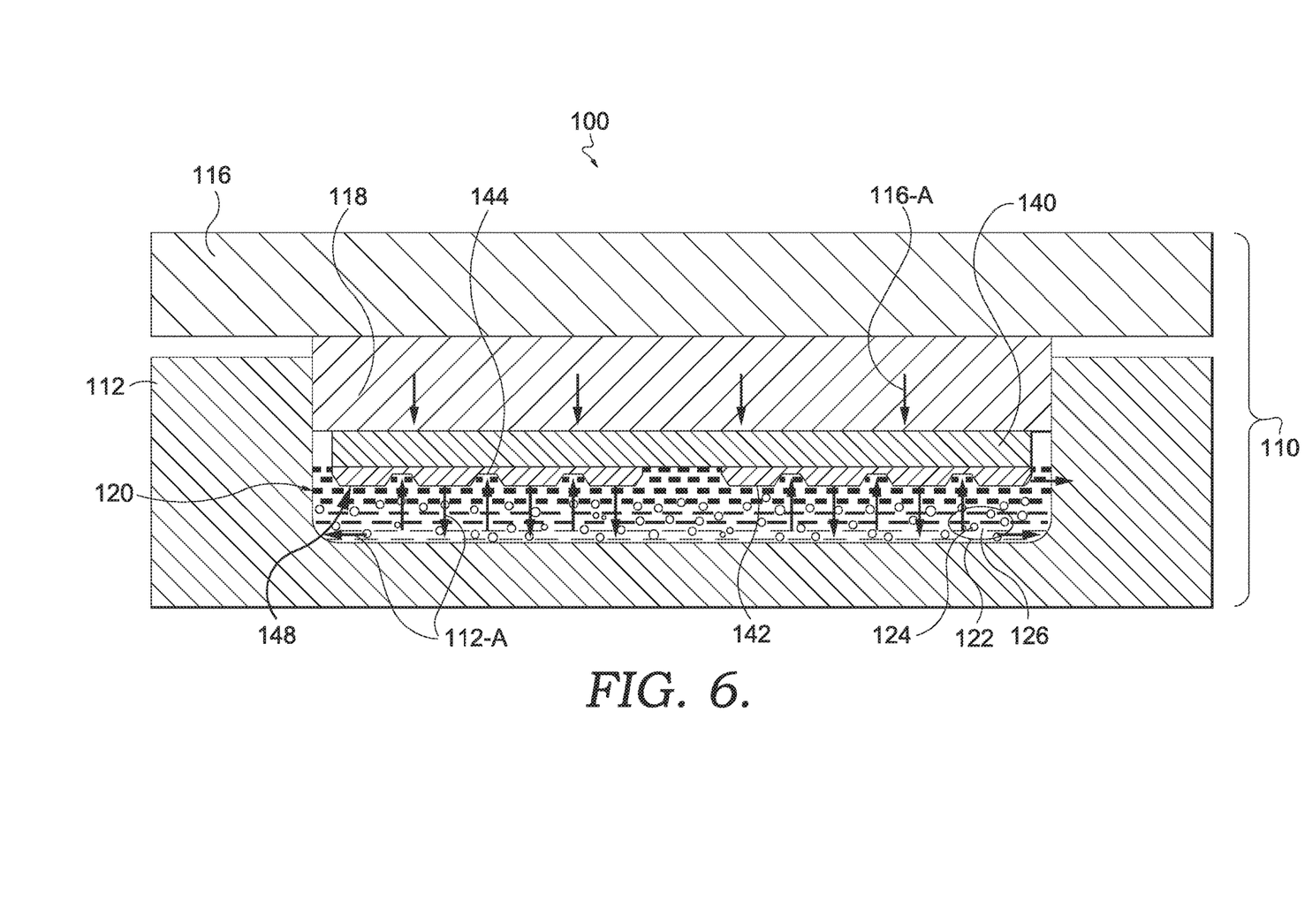
FIG. 6 depicts a cross-sectional view of the sole-subassembly bonding apparatus according to FIG. 5, taken along line 6 of FIG. 5, applying a noncritical shear force, in accordance with aspects hereof.

FIG. 6 depicts a cross-sectional view of the sole-subassembly bonding apparatus 100, taken along line 6 of FIG. 5, in the first position, and applying a first, noncritical, shear force. As can be appreciated, maximizing surface-area contact and providing an evenly distributed pressure between the outsole and the midsole 132 during pressing improves the strength of the bond. Accordingly, in order to create a bond between the outsole and the midsole 132, it is desirable to provide a contact surface within the jig 110 that provides a nested fit with a topography 148, including protrusions 142 and recesses 144, of the sole subassembly 140. However, in addition to providing a corresponding topographical or geometric fit, an aspect of the technology provides a contact surface that is rigid enough to provide a reactive force in response to the force applied by the press, in order to provide adequate pressure for achieving a bond.

Accordingly, in order to facilitate formation of a bond, the adaptive pad 120 may comprise a shear-thickening material 122 that is formulated to have a first viscosity, at the first, noncritical, shear force, such that the adaptive pad 120 is flowable about the topography 148 of the sole subassembly 140, at the first viscosity. Further, the shear-thickening material 122 may have a second viscosity, at a second, critical shear force, at which the shear-thickening material 122 becomes structurally rigid within the topography 148 of the sole subassembly 140, as will be discussed in more detail with reference to FIG. 7. Accordingly, the adaptive pad 120 described herein may be constituted to flow about the topography 148, and to become rigid as bonding pressure is applied to facilitate formation of a bond for the sole subassembly 140.

In the first position, the core 118 is in contact with the sole subassembly 140, which is interposed between the core 118 and the adaptive pad 120. Resultantly, in the first position, the top plate 116 applies the first shear force, indicated by arrows 116-A, to the sole subassembly 140. In one aspect, the first shear force may be a result of a weight or mass of the top plate 116 and core 118 being supported by the sole subassembly 140, independent of any external force. In another aspect, the first shear force may be provided by an external force, such as a pressing machine. As the first shear force is imparted to the sole subassembly 140, the sole subassembly 140 transmits the first shear force to the shear-thickening material 122 of the adaptive pad 120. Additionally, the first shear force creates pressure within the shear-thickening material 122 as the first shear force pushes the shear-thickening material 122 against the rigid surface of the bottom plate 112. Accordingly, a first reaction force, indicated by arrows 112-A, is generated in response to the first shear force. As a result, the adaptive pad 120 flows to conform to a topography 148 corresponding to the tread pattern 146 of sole subassembly 140.

As mentioned hereinabove, the shear-thickening material 122 may comprise a suspension of solid particles 124 in a fluid medium 126. The suspension may be formulated to have an appropriate constitutive relation between solid particles 124 and the fluid medium 126 that provides a viscosity that increases as shear force increases. Additionally, the shear-thickening material 122 is constituted to have a viscosity that is flowable at noncritical shear forces, such as the first shear force. Further, the first shear force may be provided at a relatively low level, or at a relatively slow loading rate. In one aspect, the first shear force may be approximately 0 kg/cm² to about 40 kg/cm². In a more particular aspect, the first shear force may be approximately 10 kg/cm² to about 30 kg/cm². Although the noncritical shear force discussed with reference to FIG. 6 may be described as facilitating flow of the shear-thickening material 122, in some aspects, the shear-thickening material 122 may have a flow rate that allows the shear-thickening material 122 to flow about the topography 148 of the sole subassembly 140 when the sole subassembly 140 is placed within the cavity 114, in the absence of any additional force.

Accordingly, at the noncritical shear force, the fluid medium 126 may effectively lubricate the motion of the solid particles 124 within the suspension, such that friction between the solid particles 124 is sufficiently low to enable flow of the shear-thickening material 122 within cavity 114 and about the topography 148 of the sole subassembly 140. Accordingly, the shear-thickening material 122 has a flow rate that allows the shear-thickening material 122 to flow around the protrusions 142 and recesses 144, such that the adaptive pad 120 adaptively conforms to the topography 148 of sole subassembly 140, and, as a result, is in contact with the entire surface (or substantially the entire surface) thereof.

Figure 7:
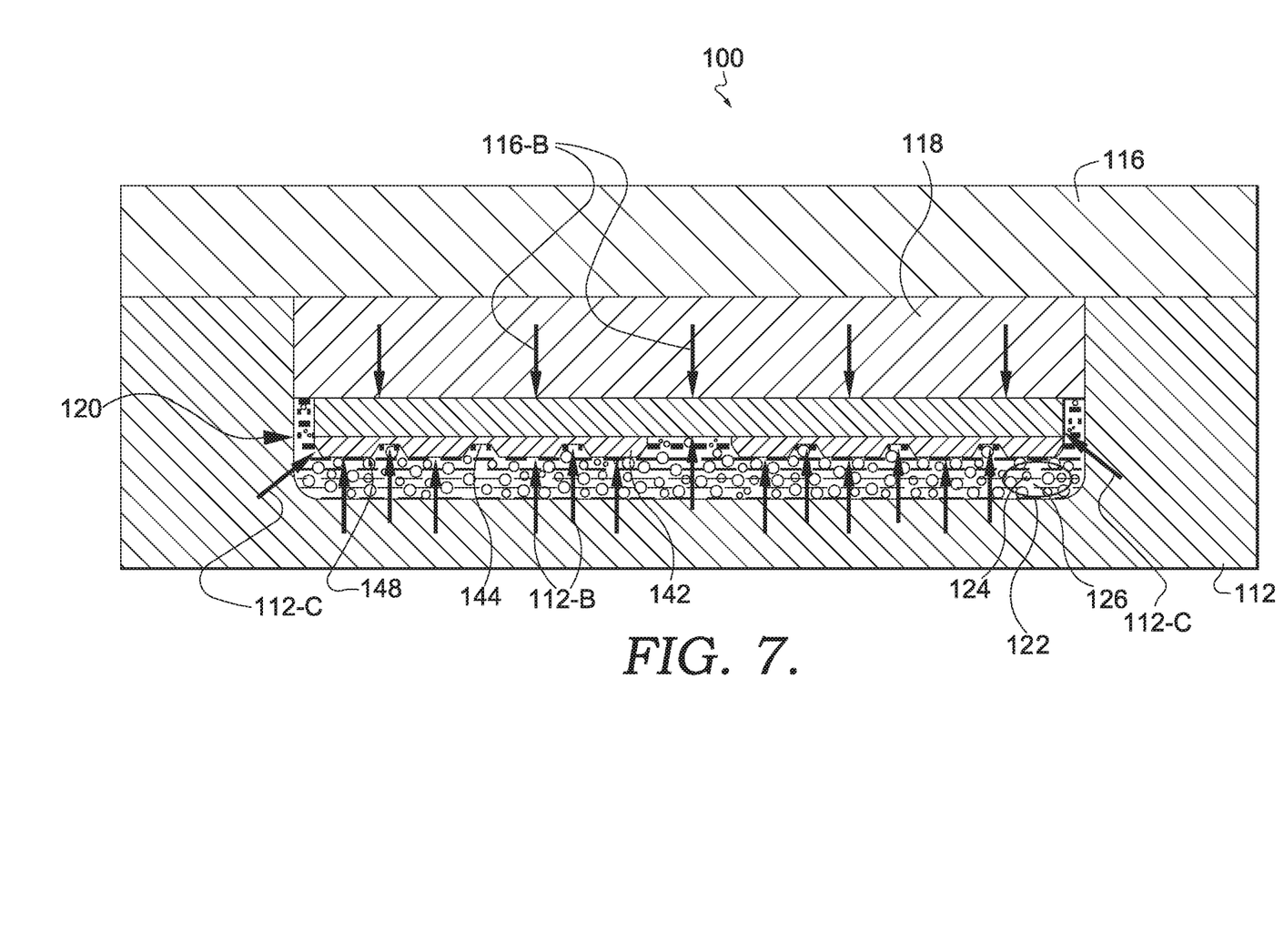
FIG. 7 depicts a cross-sectional view of the sole-subassembly bonding apparatus according to FIG. 6, applying a critical shear force, in accordance with aspects hereof.

FIG. 7 depicts a view of the sole-subassembly bonding apparatus 100, according to FIG. 6, in a second position, and applying a second, critical shear force. The critical shear force may be imparted to the adaptive pad 120 by the top plate 116, via the core 118 and the sole subassembly 140. For example, in one aspect, after the adaptive pad 120 conforms to the topography 148 of the sole subassembly 140, as shown in FIG. 6, the second force may provide the bonding pressure for curing or setting the bonding agent. As can be appreciated, the force may be gradually increased between the first shear force and the second shear force to further facilitate a corresponding fit between the adaptive pad and the topography 148. As discussed above, the forces may be applied by a pressing machine, or any other suitable mechanism.

Turning once again to the shear-thickening material 122, the viscosity of the shear-thickening material 122 increases upon application of sufficient shear force, such that the adaptive pad 120 hardens, or becomes more rigid, in response to an increase in shear force. When the shear force increases above a threshold level, or critical shear rate, the fluid-flow of the shear-thickening material 122 is substantially decreased (as compared to the fluid-flow at the first viscosity), and exhibits material properties of a solid. Accordingly, the critical shear force is a force at or above the critical shear rate of the shear-thickening material 122.

Further, the shear-thickening material 122 may be formulated such that the viscosity of the shear-thickening material 122 increases non-linearly with shear forces when the critical shear rate is reached (for example, when the shear-thickening material 122 is a discontinuous shear-thickening material). Said another way, in this aspect, the viscosity of the shear-thickening material 122 increases at a higher rate than the rate of increase in shear force, as shear force is increased beyond the critical shear rate, the viscosity of the shear-thickening material 122 rapidly increases to produce a solid-like behavior within the shear-thickening material 122. In effect, the increased shear force moves the solid particles 124 within the shear-thickening material 122 closer to one another. When the solid particles 124 are moved sufficiently close to one another such that solid-to-solid contact between the solid particles 124 is created, friction is generated by the solid particles 124. As a result, the viscosity of the shear-thickening material 122 increases rapidly as movement of the solid particles 124 within the fluid medium 126 is restricted, which creates the solid-like behavior. Additionally, the shear-thickening material 122 may be a time-independent shear-thickening material 122, in that the solid particles 124 do not settle within the fluid medium 126 over time. Accordingly, the properties of the shear-thickening material 122 may remain constant, or near constant, over time such that the adaptive pad 120 may be used indefinitely.

The critical shear force, indicated by arrows 116-B, may imparted in a similar manner to the noncritical shear force, as discussed with reference to FIG. 6, but at an increased force, or increased loading rate. As a result, the critical shear force causes increased rigidity within the shear-thickening material 122, due to the increased viscosity produced by exceeding the critical shear rate. Because the shear-thickening material 122 exhibits solid-like behavior in response to the critical shear force, a second reaction force is produced, as indicated by arrows 112-B. Accordingly, the second reaction force is similar to, or greater than, a reaction force that would be produced by a non-adaptive pad or a traditional jig, such as a conventional jig or a Computer Numerical Control ("CNC") manufactured pad.

Resultant to the second reaction force, the adaptive pad 120 applies bonding pressure that is spread evenly across the surface of the sole subassembly 140, providing a consistent bond between the midsole 132 and outsole elements 136 for the entire topography 148 created by the tread pattern 146. For example, the second reaction force may supply bonding pressure, at protrusions 142, within recesses 144. Additionally, the bonding pressure may be applied at joints between the midsole 132 and the outsole elements 136, such as at an exterior joint of between the midsole 132 and the outsole elements 136, as indicated by arrows 112-C.

Once the bonding agent has set, the pressure applied to the jig 110 may be reduced, and the bottom and top plates may be separated to allow the sole subassembly 140 to be removed. At that point, another midsole with one or more outsole elements can be arranged within the sole-subassembly bonding apparatus 100. Because of the flowable nature of the adaptive pad 120, the outsole elements may have a different configuration than those illustrated by the previously described outsole elements 136. For example, the subsequent outsole elements may have a different tread pattern with a different groove configuration and other different concavities. In this sense, the adaptive pad 120 may be used to form sole subassemblies with a variety of different topographies, including sole subassemblies with flat or smooth outsoles (or other surface-engaging shoe parts).

As mentioned above, any number of bonding agents may be used to couple the midsole 132 with the outsole elements 136. In one exemplary aspect, the bonding agent may be a pressure-sensitive adhesive ("PSA"). The PSA may set or cure through the application of a sufficient pressure. An exemplary PSA may be formulated to provide a balance between flow and resistance to flow. Accordingly, in this example, the noncritical shear force may facilitate flow of and evenly disperse the PSA between the midsole 132 and the outsole elements 136. Further, the critical shear force may initiate molecular interactions within the PSA, such as van der Waals forces, thereby providing a bond. Further, the noncritical shear force and the critical shear force may be applied for a variable duration of time, depending on the type of bonding agent utilized. For example, when a multi-component adhesive is used as the bonding agent, the noncritical shear force may be applied for an appropriate duration to facilitate dispersion of the multi-component adhesive. Continuing with this example, the critical shear force may be applied for an appropriate duration depending on a curing rate of the multi-component adhesive. Accordingly, the critical shear force may be applied, for example, by a pressing machine for a duration corresponding to the curing rate of the multi-component adhesive. Although PSA and the multi-component adhesives are provided as examples of suitable bonding agents, as discussed above, any number of suitable bonding agents may be employed with the sole-subassembly bonding apparatus 100.

Figure 8:
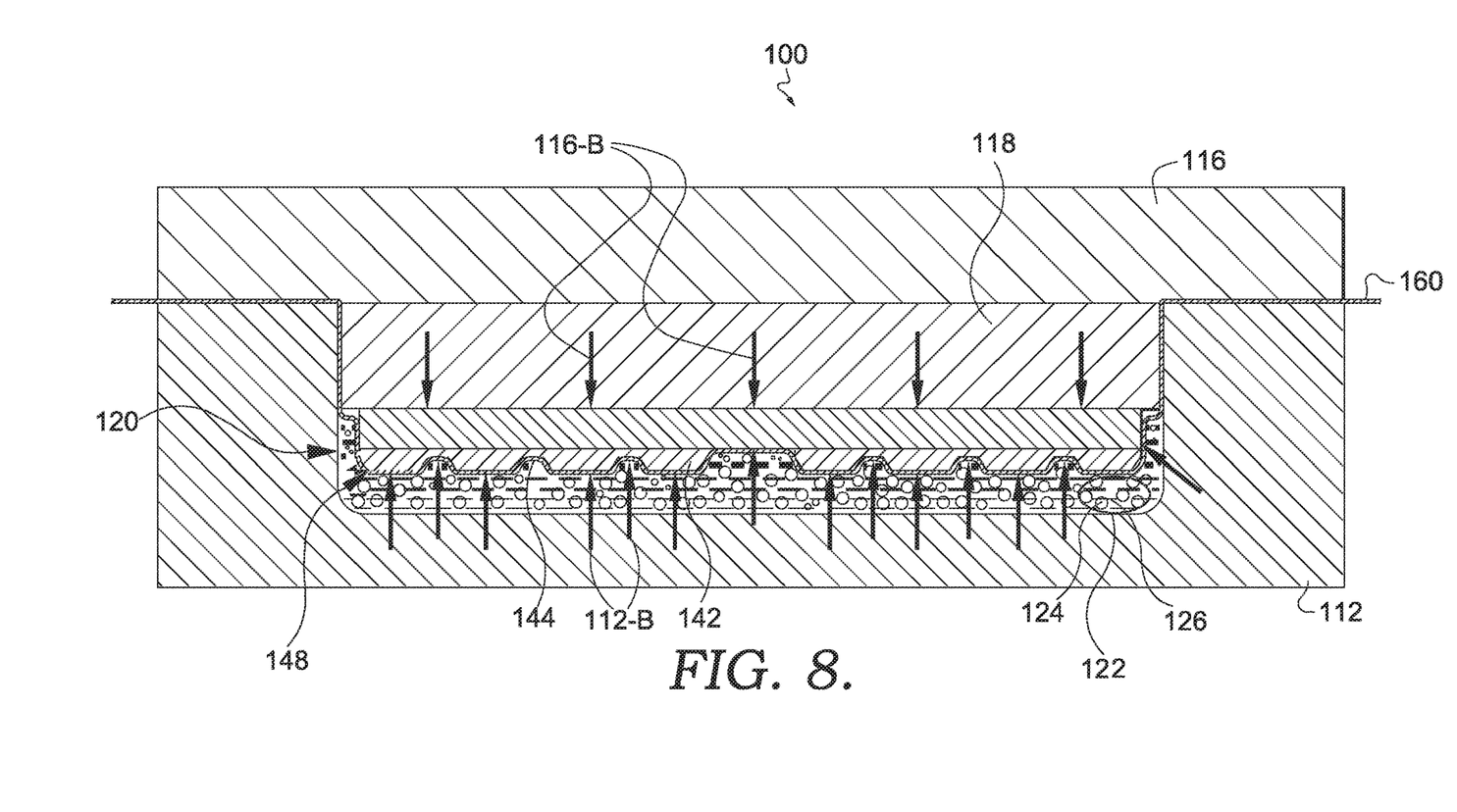
FIG. 8 depicts a cross-sectional view of the sole-subassembly bonding apparatus according to FIG. 7, having a partition layer adjacent the sole subassembly, in accordance with aspects hereof.

FIG. 8 depicts a cross-sectional view of the sole-subassembly bonding apparatus 100 according to FIG. 7, having a partition layer 160 interposed between the sole subassembly 140 and the adaptive pad 120. In this aspect, the partition layer 160 separates the adaptive pad 120 from the sole subassembly 140. As can be appreciated, the partition layer 160 may be placed within the cavity 114 on top of the shear-thickening material 122 prior to placing the sole subassembly 140 into the cavity 114. In another aspect, the partition layer 160 may be coupled to the sole subassembly 140, for example, when the outsole elements 136 and the midsole 132 are coupled.

In some aspects, the partition layer 160 may prevent the shear-thickening material 122 from becoming lodged within the recesses 144 of the sole subassembly 140. As can be appreciated, this may facilitate separation of the sole subassembly 140 from the adaptive pad 120 after the bonding pressure has been applied. Accordingly, the partition layer 160 may be a material that provides a low coefficient of friction and that is deformable, such that the partition layer 160 conforms to the contours of the topography 148 of the sole subassembly 140, and facilitates separation of the sole subassembly 140 and the adaptive pad 120 after bonding has been achieved.

Figure 9:
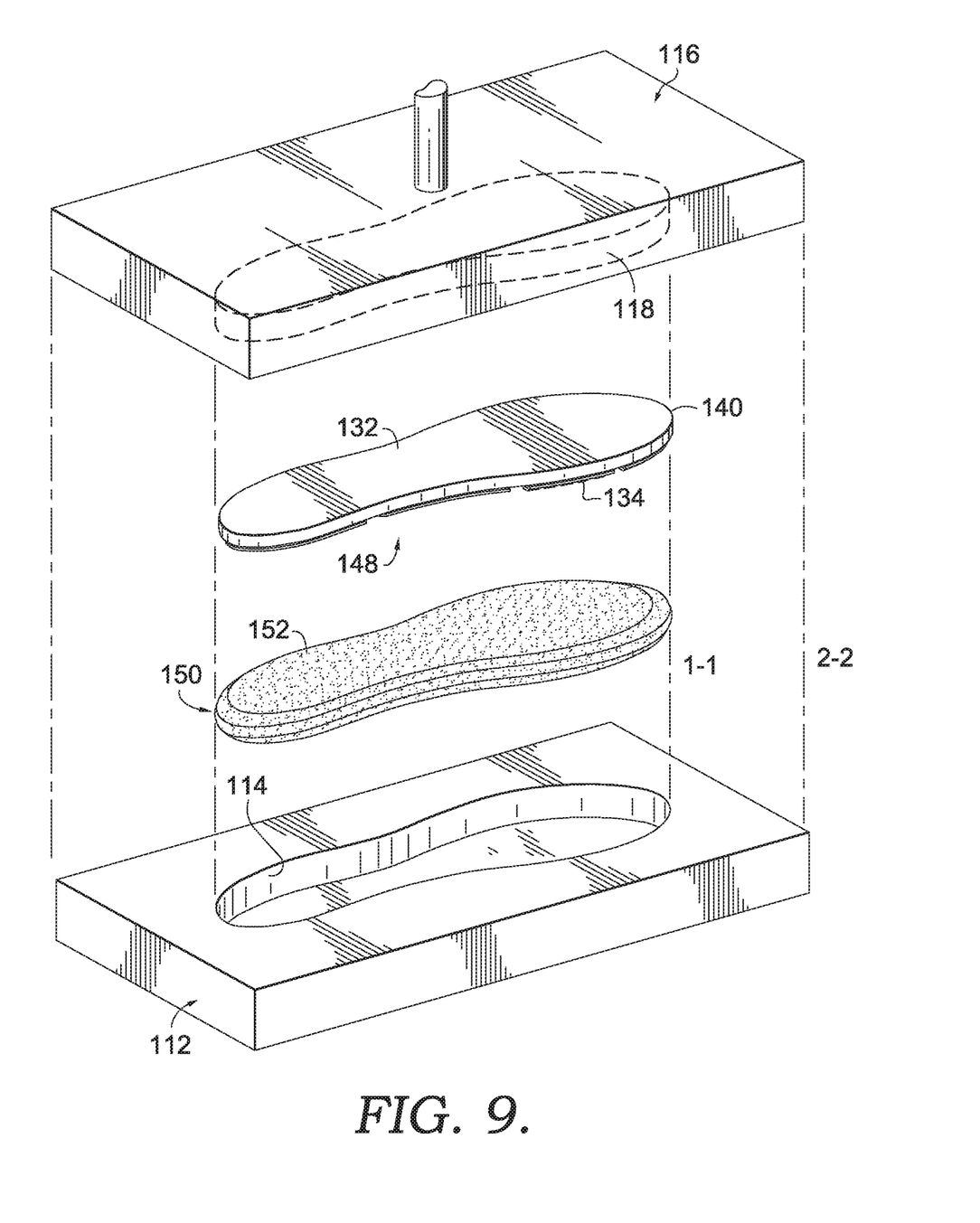
FIG. 9 depicts a top perspective view of another sole-subassembly bonding apparatus having an unassembled sole subassembly, and a self-contained press pad, in accordance with aspects hereof.

Turning now to another aspect, FIG. 9 depicts a top perspective view of another sole-subassembly bonding apparatus 100 having a self-contained adaptive pad 150. The self-contained adaptive pad 150 may comprise a shear-thickening material (shown as element 122 in FIG. 10) that is confined to a membrane or bladder 152. The self-contained adaptive pad 150 may be generally sized to fit within the cavity 114 (for example, as indicated by line 1-1). In operation, the self-contained adaptive pad 150 may be used with the sole-subassembly bonding apparatus 100 to manufacture sole subassemblies 140, as discussed above with reference to FIGS. 3-7. The bladder 152 may be elastic or deformable when subjected to pressure or force, yet may return to a default shape and size in the absence of pressure or force. Further, the bladder 152 may be sufficiently elastic to allow the self-contained adaptive pad 150 to conform to the topography 148 of the sole subassembly 140, when the only force applied to the self-contained adaptive pad 150 is the force created by placing the sole subassembly 140 in contact with the self-contained adaptive pad 150, or at the first force discussed above with reference to FIG. 6.

Figure 10:
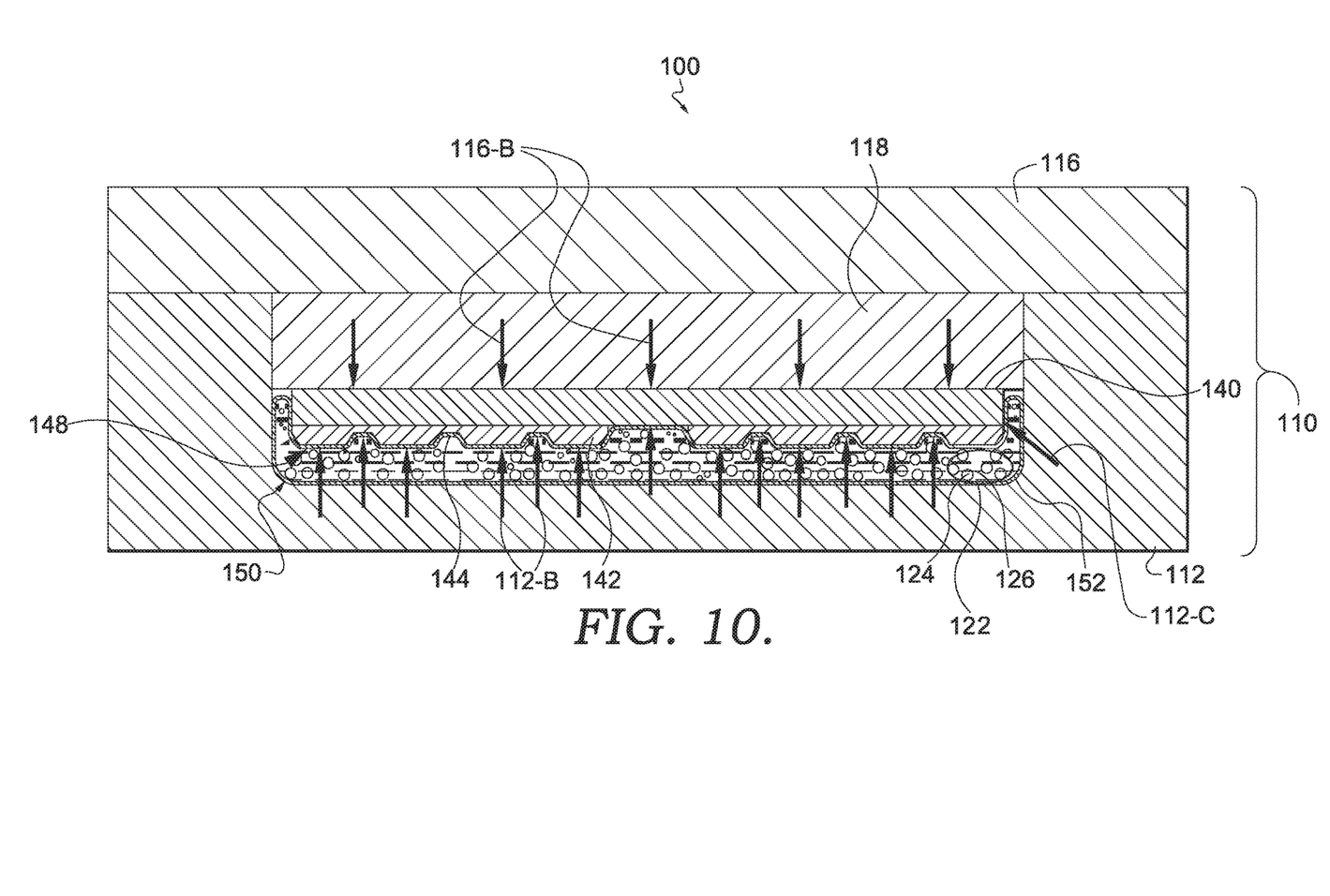
FIG. 10 depicts a cross-sectional view of the sole-subassembly bonding apparatus according to FIG. 9, applying a critical shear force, in accordance with aspects hereof.

FIG. 10 depicts a cross-sectional view of the sole-subassembly bonding apparatus 100 according to FIG. 9, applying a critical shear force. The bladder 152 of the self-contained adaptive pad 150 may contain a shear-thickening material 122, which may be a suspension of solid particles 124 in a fluid medium 126, as described above. Further, although shown here with the critical shear force applied, the bladder 152 may be constituted such that it conforms to the topography 148 of the sole subassembly 140, with the shear-thickening material 122, when the self-contained adaptive pad 150 is subjected to a force below the critical shear force (similar to the adaptive pad 120 depicted in FIG. 6). Accordingly, the bladder 152 may be formed from any suitable material. In one aspect, the bladder 152 is formed from a material that becomes less viscous or elastic when subjected to shear forces. For example, in one aspect, the bladder 152 yields to relatively low shear forces, yet has sufficient elasticity to return to the default shape and size when the forces are removed.

As discussed above, the critical shear force causes increased rigidity within the shear-thickening material 122, due to the increased viscosity at or above the critical shear rate. Because the shear-thickening material 122 exhibits solid-like behavior in response to the critical shear force, the self-contained adaptive pad 150 applies even bonding pressure (for example as indicated by reaction force 112-B) across the topography 148 of the sole subassembly 140. Further, the bladder 152 may provide a barrier between the shear-thickening material 122 and the sole subassembly 140. In some aspects, the bladder 152 may prevent the shear-thickening material 122 from becoming lodged within the recesses 144 of the sole subassembly 140. As can be appreciated, this may facilitate separation of the sole subassembly 140 from the self-contained adaptive pad 150 after the bonding pressure has been applied. Additionally, the bladder 152 may provide a self-contained adaptive pad 150 that is easily removable from the jig 110.

Figure 11:
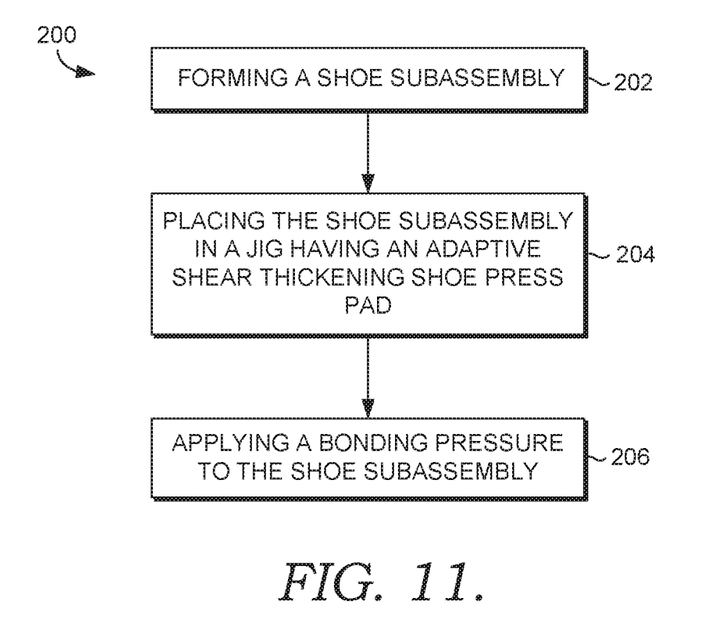
FIG. 11 depicts a block diagram illustrating a manufacturing a shoe subassembly, in accordance with aspects hereof.

FIG. 11 depicts a block diagram illustrating a method 200 for manufacturing a shoe subassembly. The method may include, as shown at block 202, forming a sole subassembly by applying an adhesive to a first shoe part and by mating the first shoe part with the adhesive to a second shoe part. In some aspects, the first shoe part may comprise a midsole and the second shoe part may comprise at least one outsole element, or vice versa. And in other aspects, the method includes bonding a midsole element to a midsole element or bonding an outsole element to an outsole element. The adhesive may be a pressure-sensitive adhesive, or any suitable bonding agent as discussed hereinabove.

At block 204, the method includes placing the sole subassembly in a jig, such as a cavity of a bottom plate, such that the sole subassembly is adjacent to an adaptive shoe press pad disposed within the cavity. In one aspect, the adaptive shoe press pad comprises a shear-thickening material that, as previously described, is flowable about a topography of a tread pattern of the sole subassembly at a noncritical shear force, and that is structurally rigid within the topography of the tread pattern of the sole subassembly at a critical shear force. Additionally, the shear-thickening material may be a suspension of solid particles in a fluid medium and may exhibit material properties of a solid material when subjected to a critical shear rate (for example at the critical shear force). Further, the method may include placing a partition layer in the jig that separates the shear-thickening material and the sole subassembly. In additional aspects, the adaptive shoe press pad may comprise a self-contained adaptive pad comprising a shear thickening material contained within a bladder.

As shown at block 206, the method may comprise applying a shear force, for example, the critical shear force to the sole subassembly, to facilitate bonding of the sole subassembly. Additionally, the critical shear force may set the bonding agent. In some aspects, the method may also include applying a noncritical shear force to the sole subassembly, prior to applying to the critical shear force. Applying the noncritical shear force may facilitate flow of the shear-thickening material about the topography of the sole subassembly. In additional aspects, the jig includes a top plate and a top jig projection, and the critical shear force and the noncritical shear force are applied to the top plate by a pressing machine. Further, the critical and noncritical shear forces may be applied for varying durations and at varying pressures or forces, as described above.

Accordingly, one aspect herein relates to an adaptive shoe press pad. The adaptive shoe press pad may comprise a shear-thickening material having a plurality of solid particles suspended in a fluid medium. The adaptive shoe press pad may be placed in or poured into a cavity within a sole-subassembly bonding jig. In some aspects, a partition layer may be provided that separates the adaptive shoe press pad from the sole subassembly. The shear-thickening material suspension may be formulated to have an appropriate constitutive relation between solid particles and the fluid medium, such that the shear-thickening material is flowable about a variety of contours of a tread pattern of a sole subassembly. Further, the shear-thickening material may be constituted such that as shear forces (or shear rate) applied to the shear-thickening material increase, a viscosity of the shear-thickening material also increases. The shear-thickening material may also have a critical shear rate, at which a critical shear force causes the shear-thickening material to harden or thicken, and take on material properties of a solid. Even further, the shear-thickening material may be constituted such that when the critical shear force is no longer applied, the suspension returns to a normal, pre-critical state.

In another aspect, a self-contained adaptive shoe press pad is provided. The self-contained adaptive shoe press pad may comprise a shear-thickening material that is confined to a bladder or membrane. The shear-thickening material may be a fluid suspension of solid particles, similar to the shear-thickening material described above. The bladder may be formed from any suitable elastic material. The membrane is deformable when subjected to pressure or force, yet returns to a normal shape in the absence of the pressure or force. Further, the membrane is constituted such that it is deformable and adaptive when the self-contained adaptive shoe press pad is subjected to a force below the critical shear rate of the shear-thickening material. Accordingly, the self-contained adaptive shoe press pad may conform to the topography of a tread pattern of a sole subassembly. In operation, the self-contained adaptive shoe press pad may be used to bond shoe sole subassemblies in a manner similar to the adaptive shoe press pad discussed above.

Yet another aspect herein relates to a shoe part bonding apparatus. The apparatus may comprise a bottom plate comprising a flow-control cavity. An adaptive shoe press pad may be disposed within the flow-control cavity of the bottom plate. The adaptive shoe press pad may comprise a shear-thickening material that is flowable about a topography of a sole subassembly at a first, noncritical shear force, below a critical shear rate for the shear-thickening material. The shear-thickening material may also be structurally rigid within the topography of the tread pattern of the sole subassembly, at a second, critical shear force, above the critical shear rate for the shear-thickening material. In other aspects the adaptive shoe press pad may include, a partition layer or a bladder. The apparatus may also include a top plate that applies pressure to the sole subassembly, which may be interposed between the adaptive shoe press pad and the top plate.

Additional aspects herein relate to a method for attaching a first shoe part to a second shoe part. The method may include forming a sole subassembly by applying an adhesive to a first shoe part and by mating the first shoe part with the adhesive to a second shoe part. In some aspects, the first shoe part may be a midsole and the second shoe part may be an outsole, which, when coupled, form a sole subassembly. The method may also include placing the subassembly in a jig, such as cavity of a bottom plate, such that the subassembly is adjacent to an adaptive shoe press pad disposed within the flow-control jig. The adaptive shoe press pad comprises a shear-thickening material that is flowable about a topography of a tread pattern of the sole subassembly at a noncritical shear force, and that is structurally rigid within the topography of the tread pattern of the sole subassembly at a critical shear force. The method may also include applying a bonding pressure, at or above the critical shear force, to the sole subassembly.

As used herein and in connection with the claims listed hereinafter, the terminology "any of clauses" or similar variations of said terminology is intended to be interpreted such that features of claims/clauses may be combined in any combination. For example, an exemplary clause 4 may indicate the method/apparatus of any of clauses 1 through 3, which is intended to be interpreted such that features of clause 1 and clause 4 may be combined, elements of clause 2 and clause 4 may be combined, elements of clause 3 and 4 may be combined, elements of clauses 1, 2, and 4 may be combined, elements of clauses 2, 3, and 4 may be combined, elements of clauses 1, 2, 3, and 4 may be combined, and/or other variations. Further, the terminology "any of clauses" or similar variations of said terminology is intended to include "any one of clauses" or other variations of such terminology, as indicated by some of the examples provided above.

Clause 1. A method of manufacturing a shoe subassembly, the method comprising: forming a sole subassembly by applying an adhesive to a first shoe part and by mating the first shoe part with the adhesive to a second shoe part; placing the sole subassembly in a cavity of a first plate of a jig, such that the sole subassembly is adjacent to a shoe press pad disposed within the cavity, wherein the shoe press pad comprises a shear-thickening material that is flowable about a topography of a tread pattern of the sole subassembly at a noncritical shear force and that is structurally rigid within the topography of the tread pattern of the sole subassembly at a critical shear force; and applying a bonding pressure to the sole subassembly, wherein the bonding pressure imparts a shear force to the shoe press pad at or above the critical shear force.

Clause 2. The method according to clause 1, further comprising applying a noncritical shear force to the sole subassembly, prior to applying to the critical shear force.

Clause 3. The method according to 2, wherein applying the noncritical shear force facilitates flow of the shear-thickening material about the topography of the sole subassembly.

Clause 4. The method according to any of clauses 1 through 3, wherein the adhesive is a pressure-sensitive adhesive and wherein the critical shear force sets the pressure-sensitive adhesive.

Clause 5. The method according to any of clauses 1 through 4, wherein the shear-thickening material exhibits one or more material properties of a solid material when the critical shear force is applied.

Clause 6. The method according to any of clauses 1 through 5, wherein the jig includes a second plate and the critical shear force and the noncritical shear force are applied to the second plate by a pressing machine.

Clause 7. The method according to any of clauses 1 through 6, further comprising placing a partition layer in the jig, such that the partition layer separates the shear-thickening material and the sole subassembly.

Clause 8. The method according to any of clauses 1 through 7, wherein the shear-thickening material is contained in a bladder.

Clause 9. A shoe press pad for coupling a first sole element to a second sole element to form a sole subassembly, the shoe press pad comprising: a shear-thickening material comprising a suspension of solid particles in a fluid medium, wherein the suspension is formulated such that: a viscosity of the suspension increases as a shear force applied to the shoe press pad increases; at a noncritical shear force, the suspension has a first viscosity, wherein the suspension is flowable about a topography of the sole subassembly at the first viscosity; and at a critical shear force, the suspension has a second viscosity, wherein the suspension is structurally rigid within the topography of the sole subassembly at the second viscosity.

Clause 10. The shoe press pad according to clause 9, wherein the viscosity of the suspension decreases as the shear force applied to the shoe press pad decreases, such that the suspension returns to the first viscosity in an absence of the critical shear force.

Clause 11. The shoe press pad according to any of clauses 9 through 10, wherein a constitutive relation between the solid particles and the fluid medium of the suspension provides a suspension that this is flowable in an absence of an external pressure.

Clause 12. The shoe press pad according to any of clauses 9 through 11, further comprising an elastic bladder containing the shear-thickening material.

Clause 13. The shoe press pad according to any of clauses 9 through 12, wherein the noncritical shear force is below 20 kg/cm$^2$.

Clause 14. The shoe press pad according to any of clauses 9 through 13, wherein the critical shear force is at or above 20 kg/cm$^2$.

Clause 15. A shoe part bonding apparatus for bonding a first shoe part and a second shoe part to form a sole subassembly, the shoe part bonding apparatus comprising: a first plate comprising a flow-control cavity; a shoe press pad disposed within the flow-control cavity of the first plate, the shoe press pad comprising a shear-thickening material that is flowable about a topography of the sole subassembly at a first shear force and that is structurally rigid within the topography of the sole subassembly at a second shear force; and a second plate that applies pressure to sole subassembly, wherein the sole subassembly is interposed between the shoe press pad and the second plate.

Clause 16. The shoe part bonding apparatus of clause 15, further comprising, a bladder containing the shear-thickening material.

Clause 17. The shoe part bonding apparatus of any of clauses 15 through 16, further comprising, a partition layer disposed between the shoe press pad and the sole subassembly.

Clause 18. The shoe part bonding apparatus of any of clauses 15 through 17, wherein the second plate applies at least the second pressure.

Clause 19. The shoe part bonding apparatus of any of clauses 15 through 18, wherein the first shear force is below a critical shear rate for the shear-thickening material.

Clause 20. The shoe part bonding apparatus of any of clauses 15 through 19, wherein the second shear force is above a critical shear rate for the shear-thickening material.

From the foregoing, it will be seen that aspects herein are well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible aspects may be made without departing from the scope thereof, it is to be understood that all matter herein set forth or shown in the accompanying drawings is to be interpreted as illustrative and not in a limiting sense.

What is claimed:

1. A method of manufacturing a shoe subassembly, the method comprising:
    forming a sole subassembly by applying an adhesive to a first shoe part and by mating the first shoe part with the adhesive to a second shoe part;
    placing the sole subassembly in a cavity of a first plate of a jig, such that the sole subassembly is adjacent to a shoe press pad disposed within the cavity, wherein the shoe press pad comprises a discontinuous shear-thickening material that is flowable about a topography of a tread pattern of the sole subassembly at a noncritical shear force and that is structurally rigid within the topography of the tread pattern of the sole subassembly at a critical shear force, wherein the discontinuous shear-thickening material has a viscosity that increases non-linearly as shear force increases; and
    applying a bonding pressure to the sole subassembly, wherein the bonding pressure imparts a shear force to the shoe press pad at or above the critical shear force.

2. The method of claim 1 further comprising, applying a noncritical shear force to the sole subassembly, prior to applying to the critical shear force.

3. The method of claim 2, wherein applying the noncritical shear force facilitates flow of the shear-thickening material about the topography of the sole subassembly.

4. The method of claim 1, wherein the adhesive is a pressure-sensitive adhesive and wherein the critical shear force sets the pressure-sensitive adhesive.

5. The method of claim 1, wherein the shear-thickening material exhibits one or more material properties of a solid material when the critical shear force is applied.

6. The method of claim 1, wherein the jig includes a second plate and the critical shear force and the noncritical shear force are applied to the second plate by a pressing machine.

7. The method of claim 1 further comprising, placing a partition layer in the jig, such that the partition layer separates the shear-thickening material and the sole subassembly.

8. The method of claim 1, wherein the shear-thickening material is contained in a bladder.

9. A shoe press pad for coupling a first sole element to a second sole element to form a sole subassembly, the shoe press pad comprising:
    a discontinuous shear-thickening material comprising a suspension of solid particles in a fluid medium, wherein the suspension is formulated such that:
    a viscosity of the suspension increases non-linearly as a shear force applied to the shoe press pad increases;
    at a noncritical shear force, the suspension has a first viscosity, wherein the suspension is flowable about a topography of the sole subassembly at the first viscosity; and
    at a critical shear force, the suspension has a second viscosity, wherein the suspension is structurally rigid within the topography of the sole subassembly at the second viscosity.

10. The shoe press pad of claim 9, wherein the viscosity of the suspension decreases as the shear force applied to the shoe press pad decreases, such that the suspension returns to the first viscosity in an absence of the critical shear force.

11. The shoe press pad of claim 9, wherein a constitutive relation between the solid particles and the fluid medium of the suspension provides a suspension that this is flowable in an absence of an external pressure.

12. The shoe press pad of claim 9 further comprising, an elastic bladder containing the shear-thickening material.

13. The shoe press pad of claim 9, wherein the noncritical shear force is below 20 $kg/cm^2$.

14. The shoe press pad of claim 9, wherein the critical shear force is at or above 20 $kg/cm^2$.

15. A shoe part bonding apparatus for bonding a first shoe part and a second shoe part to form a sole subassembly, the shoe part bonding apparatus comprising:
    a first plate comprising a flow-control cavity;
    a shoe press pad disposed within the flow-control cavity of the first plate, the shoe press pad comprising a discontinuous shear-thickening material that is flowable about a topography of the sole subassembly at a first shear force and that is structurally rigid within the topography of the sole subassembly at a second shear force, the shear-thickening material including a suspension of solid particles in a fluid medium with a viscosity that increases non-linearly as shear force increases; and
    a second plate that applies pressure to sole subassembly, wherein the sole subassembly is interposed between the shoe press pad and the second plate.

16. The apparatus of claim 15 further comprising, a bladder containing the shear-thickening material.

17. The apparatus of claim 15 further comprising, a partition layer disposed between the shoe press pad and the sole subassembly.

18. The apparatus of claim 15, wherein the second plate applies at least the second pressure.

19. The apparatus of claim 15, wherein the first shear force is below a critical shear rate for the shear-thickening material.

20. The apparatus of claim 15, wherein the second shear force is above a critical shear rate for the shear-thickening material.

* * * * *